United States Patent [19]
Garrigan et al.

[11] Patent Number: 5,903,449
[45] Date of Patent: May 11, 1999

[54] BI-DIRECTIONAL POWER CONTROL SYSTEM FOR VOLTAGE CONVERTER

[75] Inventors: Neil Richard Garrigan, Niskayuna; Robert Dean King, Schenectady; James Edward Schwartz, Slingerlands, all of N.Y.

[73] Assignee: General Electric Company, Schenectady, N.Y.

[21] Appl. No.: 09/094,285

[22] Filed: Jun. 9, 1998

[51] Int. Cl.$^6$ ....................................... H02M 1/12
[52] U.S. Cl. ................................................ 363/41
[58] Field of Search ................................. 363/40, 41, 97, 363/131; 323/273, 282, 299

[56] References Cited

U.S. PATENT DOCUMENTS

| | | | |
|---|---|---|---|
| 3,899,725 | 8/1975 | Plunkett | 318/227 |
| 5,081,409 | 1/1992 | Goff | 318/811 |
| 5,231,344 | 7/1993 | Marumoto | 322/14 |
| 5,781,423 | 7/1998 | Inarida et al. | 363/41 |

OTHER PUBLICATIONS

"Power Electronics Converters, Applications And Design" By Ned Mohan, et al, Ch. 8, Switch–Mode dc–ac Inverters: DC—Sinusoidal ac, pp. 200–248, 1989.

*Primary Examiner*—Matthew Nguyen
*Attorney, Agent, or Firm*—Ann M. Agosti; Jill M. Breedlove

[57] ABSTRACT

A control system for a voltage converter includes: a power comparator for comparing a power signal on input terminals of the converter with a commanded power signal and producing a power comparison signal; a power regulator for transforming the power comparison signal to a commanded current signal; a current comparator for comparing the commanded current signal with a measured current signal on output terminals of the converter and producing a current comparison signal; a current regulator for transforming the current comparison signal to a pulse width modulator (PWM) duty cycle command signal; and a PWM for using the PWM duty cycle command signal to control electrical switches of the converter. The control system may further include: a command multiplier for converting a voltage signal across the output terminals of the converter to a gain signal having a value between zero (0) and unity (1), and a power multiplier for multiplying the commanded power signal by the gain signal to provide a limited commanded power signal, wherein power comparator compares the limited commanded power signal with the power signal on the input terminals.

18 Claims, 7 Drawing Sheets

BI-DIRECTIONAL POWER CONTROL SYSTEM FOR VOLTAGE CONVERTER

This invention was made with Government support under contract number DEFC07-96-ID13406 awarded by the United States Department of Energy. The Government has certain rights in the invention.

BACKGROUND OF THE INVENTION

The present invention relates to voltage converter interfaces for regulating power flow.

Switch-mode converters with reversible power flow are described, for example, in Chapter 8 of Ned Mohan et al., *Power Electronics—Converters, Applications, and Design*, $2^{nd}$ ed. (John Wiley & Sons 1989). Auxiliary energy storage devices such as ultra-capacitors and batteries can be used to provide power to or receive power from DC or AC power buses. An example of such an application is the use of a battery power distribution system on an electric or hybrid vehicle. An external system controller is used to control an interface between the storage device and the power bus.

The level of power delivered to a storage device is a function of the direction of power flow. Control of the storage device power is most convenient on the storage device side of the interface. However, in some circumstances the power which actually needs to be controlled is the power flow on the power bus side of the interface. The relation between the storage device and power bus sides of the interface is complicated by interface losses and non-linear characteristics. It is thus difficult to regulate power flow on the power bus side of the interface by controlling the storage device side of the interface.

SUMMARY OF THE INVENTION

It is therefore seen to be desirable to provide a power control regulation system capable of controlling the power flow on the power bus side of a power bus/auxiliary energy storage device interface. Additionally, it would be advantageous to protect the auxiliary energy storage device by limiting the voltage across the device.

In one embodiment, the present invention provides bi-directional power control for a voltage converter with a power comparator for comparing a power signal on input terminals of the converter with a commanded power signal and producing a power comparison signal; a power regulator for transforming the power comparison signal to a commanded current signal; a current comparator for comparing the commanded current signal with a measured current signal on output terminals of the converter and producing a current comparison signal; a current regulator for transforming the current comparison signal to a pulse width modulator (PWM) duty cycle command signal; and a PWM for using the PWM duty cycle command signal to control electrical switches of the converter.

In another embodiment, a voltage limiting system for a voltage converter includes a command multiplier for converting a voltage signal across output terminals of the converter to a gain signal having a value between zero (0) and unity (1), a current multiplier for multiplying a commanded current signal by the gain signal to provide a limited commanded current signal; a current comparator for comparing the limited commanded current signal with a measured current signal on an output terminal of the converter and producing a current comparison signal; a current regulator for transforming the current comparison signal to a pulse width modulator (PWM) duty cycle command signal; and a PWM for using the PWM duty cycle command signal to control electrical switches of the converter.

In another embodiment, a control system for voltage converter includes a power comparator for comparing a power signal on output terminals of the converter with a commanded power signal and producing a power comparison signal; a power regulator for transforming the power comparison signal to a commanded current signal; a current comparator for comparing the commanded current signal with a measured current signal on the output terminals of the converter and producing a current comparison signal; a current regulator for transforming the current comparison signal to a pulse width modulator (PWM) duty cycle command signal; and a PWM for using the PWM duty cycle command signal to control electrical switches of the converter.

In another embodiment, a control system for regulating bi-directional power flow from a multi-phase power bus through a voltage converter to an auxiliary energy storage device includes: a power comparator for comparing power signals on input terminals of the converter with commanded power signals and producing power comparison signals; a power regulator for transforming the power comparison signals to commanded current signals; a current comparator for comparing the commanded current signals with measured current signals on the input terminals of the converter and producing current comparison signals; a current regulator for transforming the current comparison signals to pulse width modulator (PWM) duty cycle command signals; and a PWM for using the PWM duty cycle command signals to control electrical switches of the converter.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Although circuit diagrams are shown in the FIGS. 2–4, 7, and 10 for purposes of illustration, each of these embodiments can be implemented using digital devices (such as software or hardware in a computer, for example), analog devices, or a combination of analog and digital devices.

Figure 1:
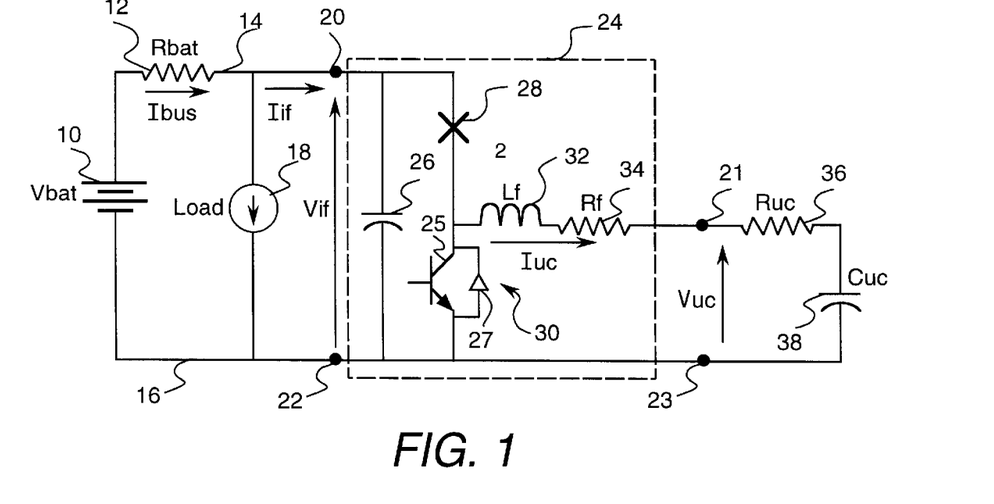
FIG. 1 is a circuit diagram of a voltage converter.
Figure 10:
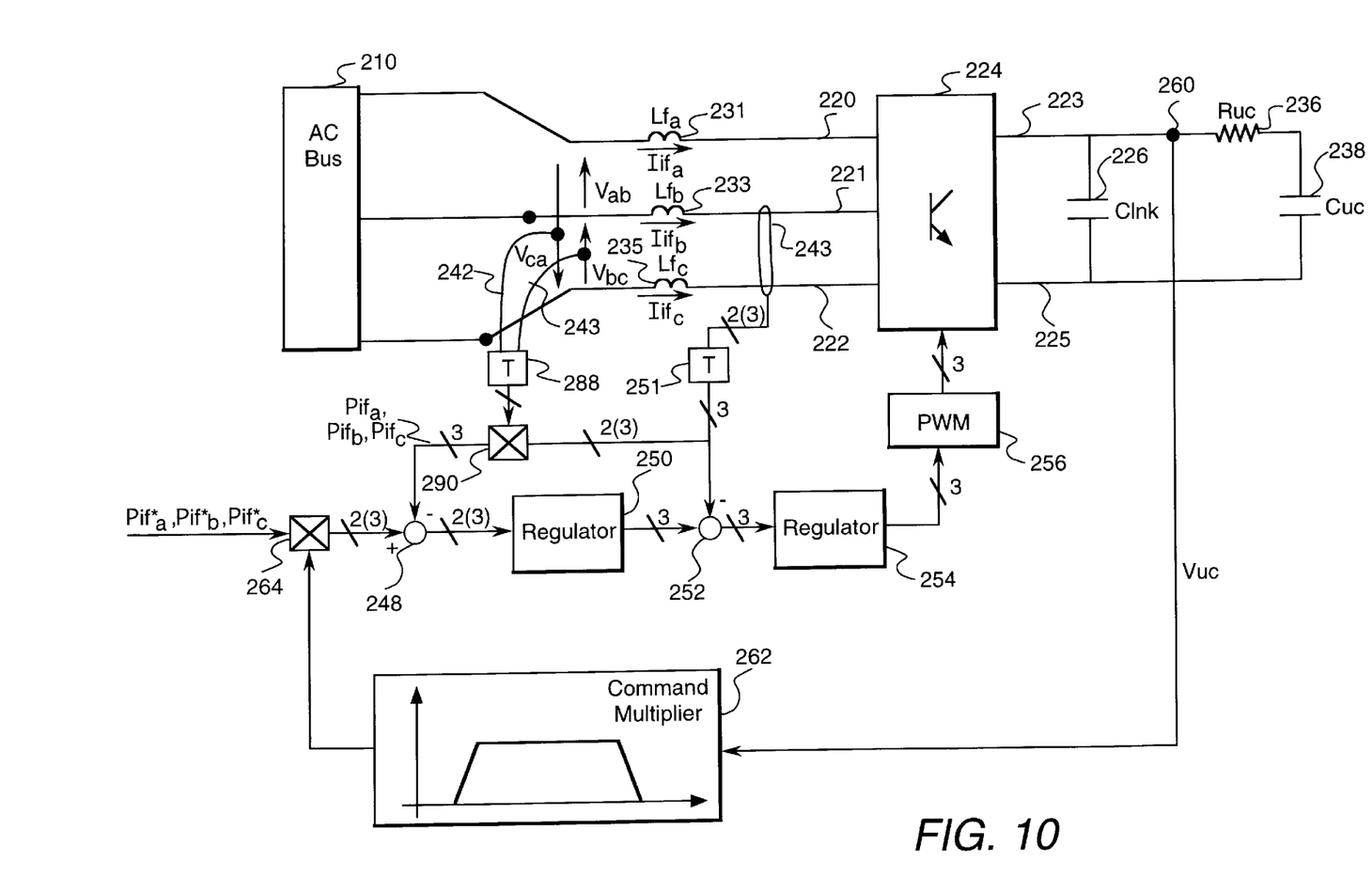
FIG. 10 is a circuit diagram of a power control system for use with a multiphase AC power bus.

In the circuit diagram of FIG. 1, a power bus having a positive DC bus 14 and a negative DC bus 16 supplies power to a load 18 which is coupled to an auxiliary energy storage device through an interface such as bi-directional voltage converter 24. Although a DC bus is shown in FIG. 1, an AC bus could alternatively be used, as shown in FIG. 10.

For purposes of example, the power bus is supplied with power from a battery 10 having a resistance 12, and the auxiliary energy storage device is shown as an ultra-capacitor 38 having a resistance 36. Other types of appropriate auxiliary energy storage devices include, for example, batteries, super-conducting magnetic electric storage devices, and flywheels.

Voltage converter 24 may comprise, for example, a capacitor 26 (preferably an ultra-capacitor) coupled in parallel with the load and in parallel with two series coupled electrical switches 28 and 30. One of the switches, shown as switch 30, is coupled in parallel with the auxiliary energy storage device. Typically each switch includes an electronic switch 25 such as an IGBT (insulated gate bipolar transistor) or a MOSFET (metal oxide semiconductor field effect transistor) coupled in anti-parallel with a diode 27. The inductance and resistance of the converter are represented by interface inductor 32 and interface resistor 34. The terminals of the converter on the power bus/load side of the converter are hereinafter referred to as input terminals 20 and 22, and the terminals of the converter on the auxiliary energy storage device side of the converter are hereinafter referred to as output terminals 21 and 23.

Although FIGS. 2–4 and 7 are shown in a buck-boost converter embodiment wherein voltage is higher on the input terminals than the output terminals, this configuration is for purposes of example only. In an alternative embodiment, for example, the output terminals could have higher voltages than the input terminals.

Figure 2:
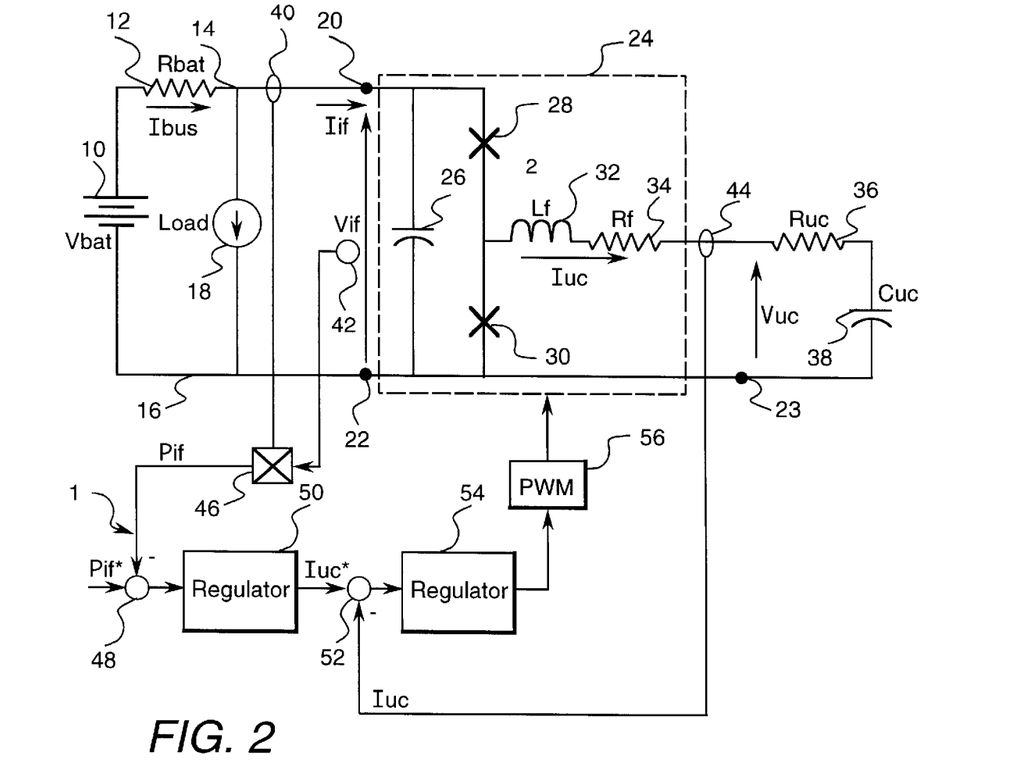
FIG. 2 is a circuit diagram of a power control system for the converter of FIG. 1.

FIG. 2 is a circuit diagram of a power control system 1 for the converter of FIG. 1. In conventional control systems, the current flowing in the auxiliary energy storage device is regulated by measuring the auxiliary energy storage device current signal Iuc with a sensor 44 and comparing measured current signal Iuc with a commanded reference current signal Iuc* at current comparator 52.

The current comparison signal (the difference between the currents) is regulated with a pulse width modulator (PWM) current regulator 54 which may comprise a proportional regulator, a proportional and integral regulator, a hysteresis regulator, or any other regulator capable of generating a duty cycle command signal for a PWM 56 such that the voltage applied to the output terminals is appropriate for reducing the error in current Iuc. The PWM receives the duty cycle command signal and converts it into pulses for switching switches 28 and 30. The PWM sends signals to control switches 28 and 30 to provide the desired power to the auxiliary energy storage device.

In the present invention, as shown in FIG. 2, the power on the input terminals of the converter is regulated by determining actual power Pif delivered to/received from converter 24 and comparing that power signal to a commanded reference signal Pif* with a power comparator 48. The power comparator generates a power comparison signal and sends the power comparison signal to a regulator 50 such as a proportion integral regulator which generates the commanded current signal Iuc*. In one embodiment the power signal Pif is determined by measuring current with a current sensor 40, measuring voltage with a voltage sensor 42, and multiplying the measured current and voltage signals with a multiplier 46.

Because the measurements are across the power bus/load side of the converter, this method is useful for automatically adjusting for disturbances introduced through the power conversion stage of the converter circuit from circuitry losses, voltage variations in the auxiliary energy storage device and the DC bus, and non-linearities in the PWM conversion.

Figure 3:
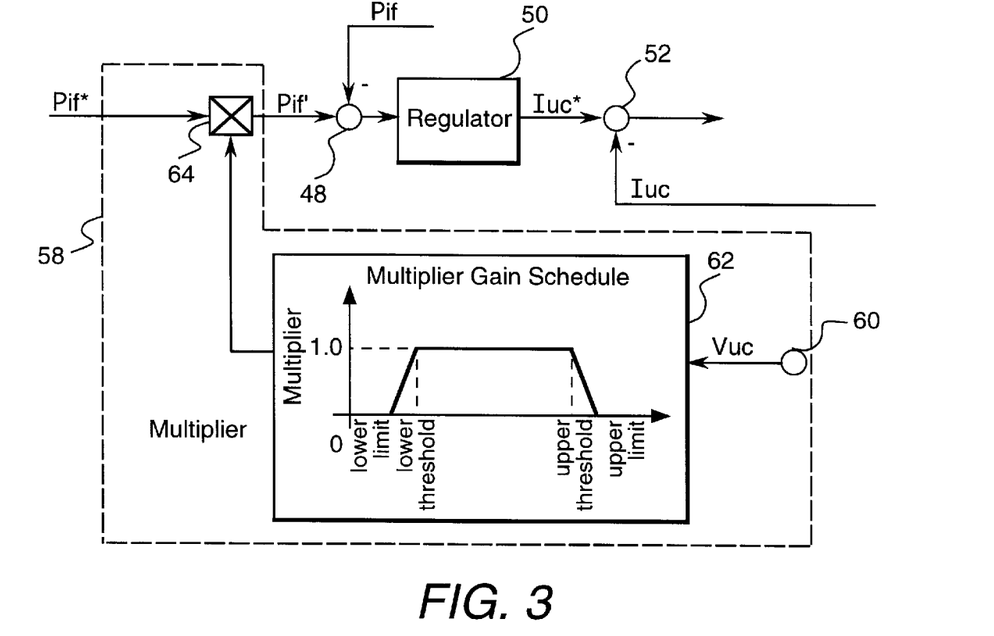
FIG. 3 is a circuit diagram of a voltage limiting system that can be used in the embodiment of FIG. 2.

FIG. 3 is a circuit diagram of an optional voltage limiting system 58 that can be used in the embodiment of FIG. 2 to limit voltage signal Vuc across the auxiliary energy storage device within at least one predetermined range by reducing the magnitude of the commanded power signal as a function of Vuc. Vuc is measured with a voltage sensor 60 and fed into a command multiplier 62. The command multiplier sets a gain signal between zero (0) and unity (1) which it supplies to a multiplier 64. Multiplier 64 receives the commanded power signal Pif*, multiplies the commanded power signal by the gain signal to obtain a limited commanded power signal Pif', and supplies the limited commanded power signal to comparator 48.

The command multiplier selects the gain signal based on the measured voltage and a user defined limiting function. In the function shown in FIG. 3, if the voltage is within upper and lower threshold values, the gain signal is unity (1), if the voltage is outside upper and lower limit values, the gain signal is zero (0), and if the voltage is outside the upper and lower threshold values and inside the upper and lower limit values, the gain signal varies linearly between unity to zero as the voltage leaves the threshold value and approaches the limit value. Although the function is shown as linear in FIG. 2, other appropriate non-linear functions or algorithms can alternatively be used.

Because the limit is imposed on the input terminal side of the voltage converter, the voltage limiting system of the present invention is capable of smoothly and continuously limiting the voltage (or energy storage device state) without saturating any internal regulators.

Figure 4:
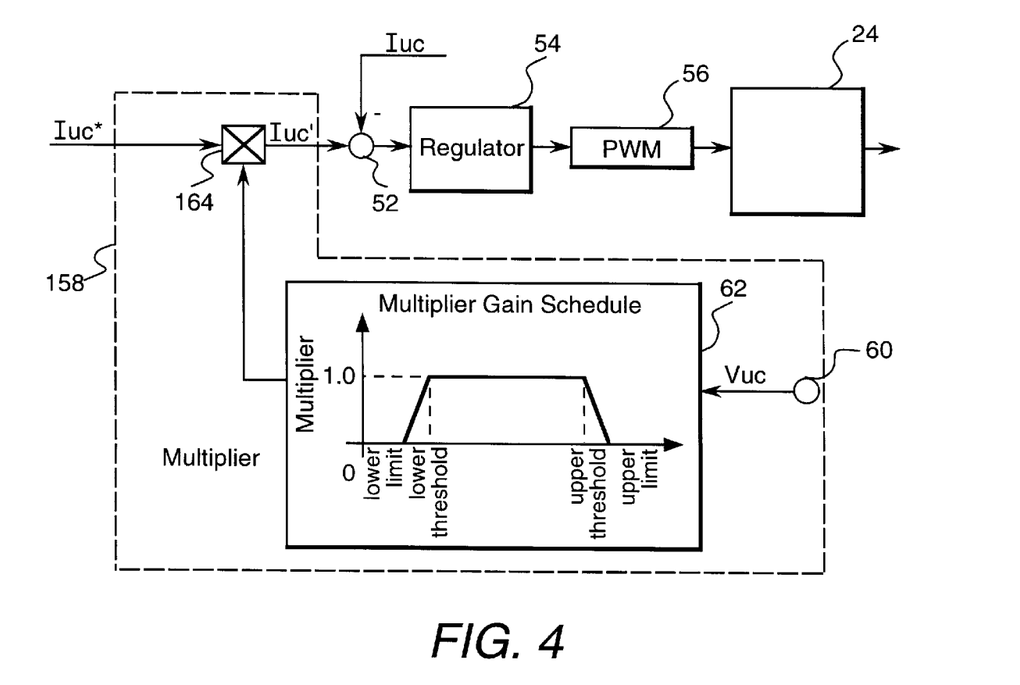
FIG. 4 is another circuit diagram of a voltage limiting system which can be used either with the embodiment of FIG. 1 or with the embodiment of FIG. 2.

FIG. 4 is another circuit diagram of a voltage limiting system 158 which can be used either with the embodiment of FIG. 1 or with the embodiment of FIG. 2. In this embodiment the voltage across the auxiliary energy storage device is regulated by reducing the magnitude of the current command as a function of that voltage.

Command multiplier 62 supplies the gain signal to a current multiplier 164 which multiplies the current command Iuc* by the gain signal to provide a limited current command value to comparator 52.

If the voltage limiting system of FIG. 4 is used with the embodiment of FIG. 2, the commanded current signal is obtained from regulator 50 of power control system 1. If the voltage limiting system of FIG. 4 is used with the embodiment of FIG. 1, the commanded current is obtained from another control system.

Figure 5:
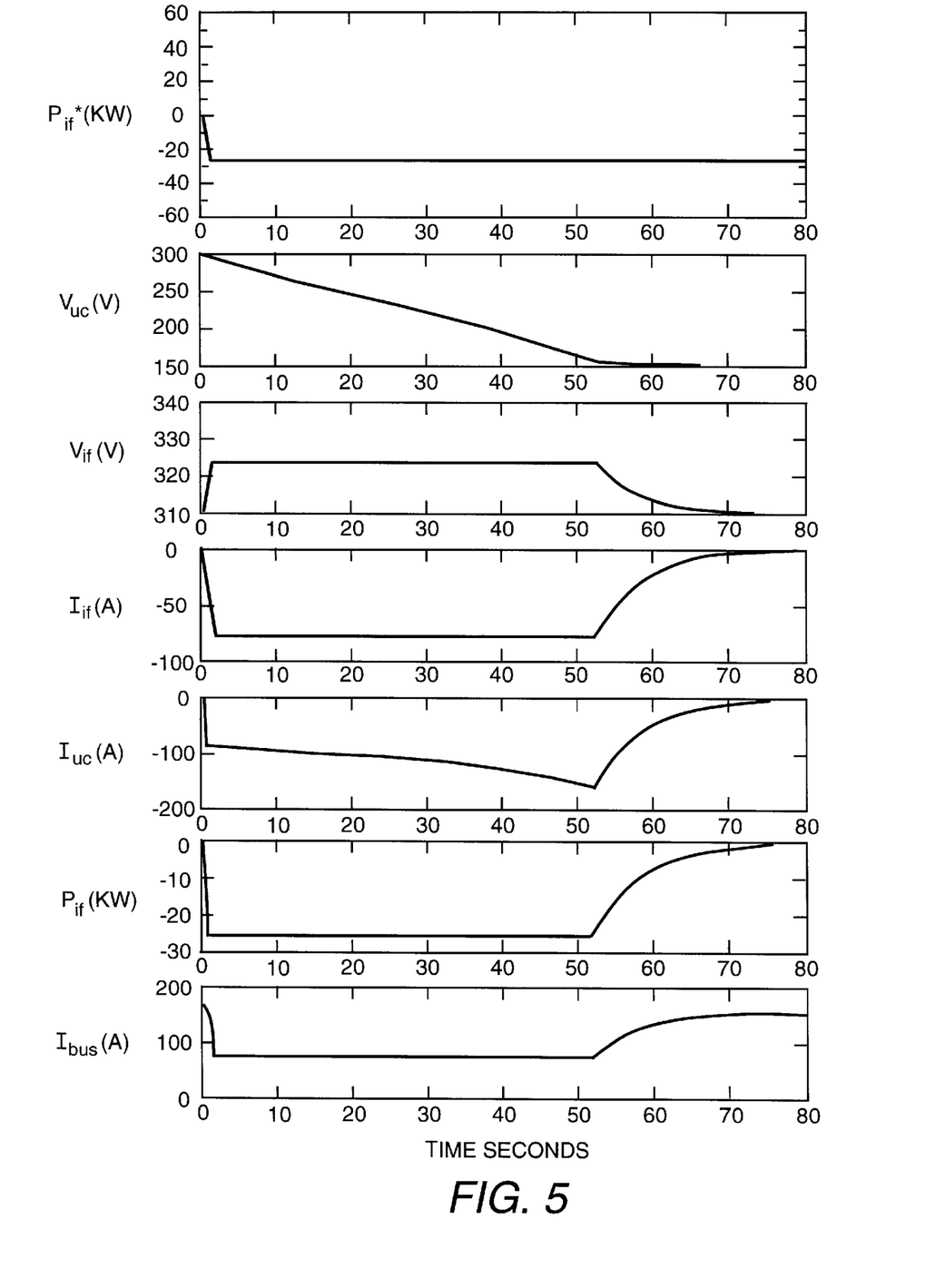
FIGS. 5 and 6 are graphs of simulated power, voltage, and current for the power control and voltage limiting system of the embodiments of FIGS. 2 and 3.
Figure 6:
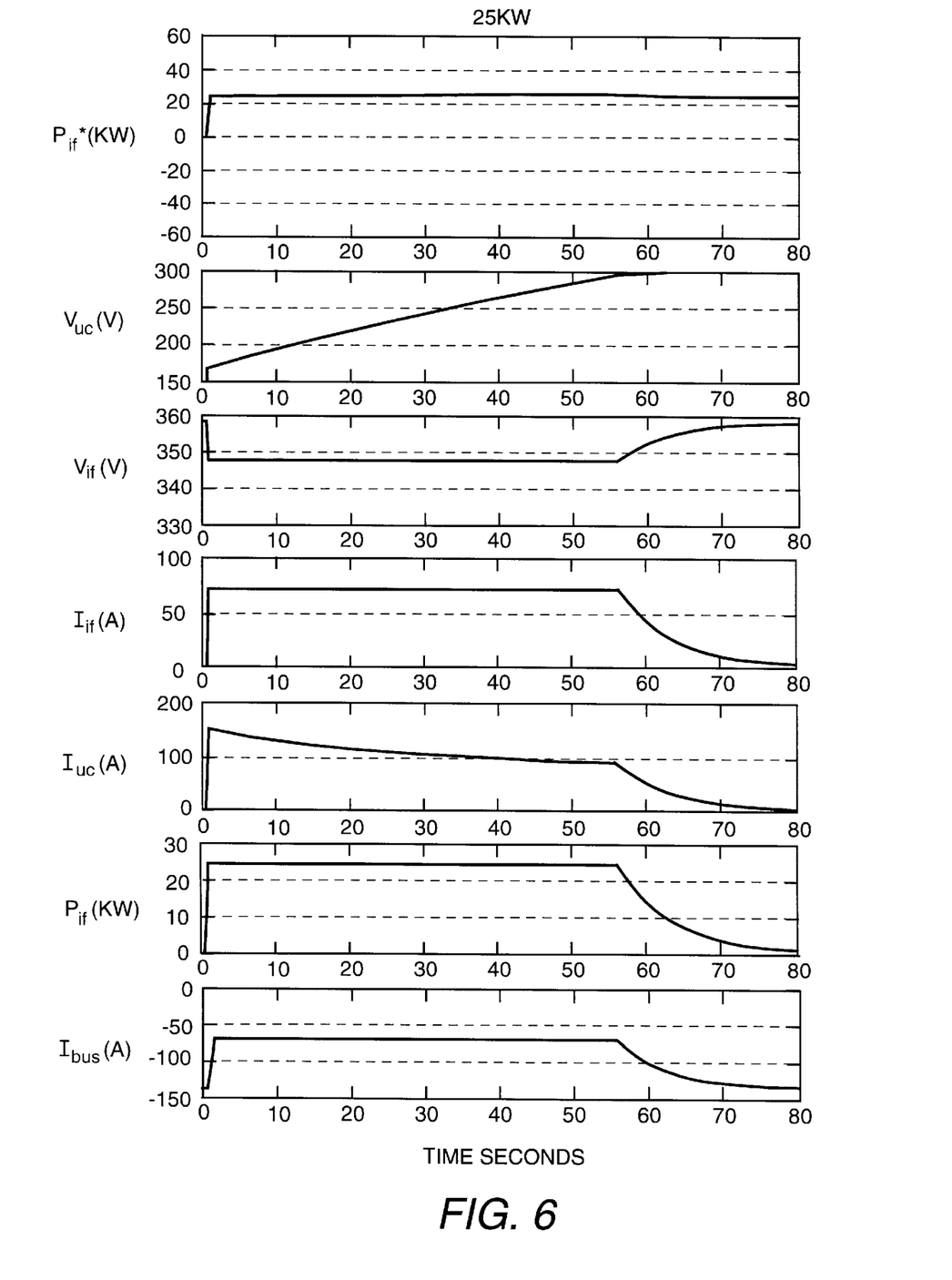

FIGS. 5 and 6 are graphs of simulated power, voltage, and current for the power control system of the embodiments of FIGS. 2 and 3. The simulation was performed for a 324 volt battery, an ultra-capacitor auxiliary energy storage device, and a voltage limit range of 150 volts to 300 volts.

FIG. 5 illustrates the effect of the application of a commanded power signal of −25 kilo watts (kW) to charge the ultra-capacitor. When the commanded power signal Pif* drops from zero to −25 kW, the voltage Vif across the input terminals of the converter increases from 310 to 322 volts and the current Iif across the input terminals of the converter decreases from 0 to −75 amperes. After the commanded power signal drops, the voltage Vuc across the output terminals of the converter (the ultra-capacitor) gradually decreases and the current Iuc across the ultra-capacitor drops and then gradually decreases. When the Vuc reaches its lower threshold, the commanded power signal becomes limited and Vif, Iif, Iuc, Pif, and Ibus begin returning to their initial values.

FIG. 6 illustrates the effect of the application of a commanded power signal of +25 kilo watts (kW) to discharge the ultra-capacitor. When the commanded power signal Pif* increases from zero to 25 kW, Vif decreases from 358 to 348 volts and Iif increases from 0 to 75 amperes. After the commanded power signal increase, Vuc gradually increases and Iuc increases from 0 to 25 amperes and then gradually decreases. When Vuc reaches its upper threshold, the commanded power signal becomes limited and Vif, Iif, Iuc, Pif, and Ibus begin returning to their initial values.

Figure 7:
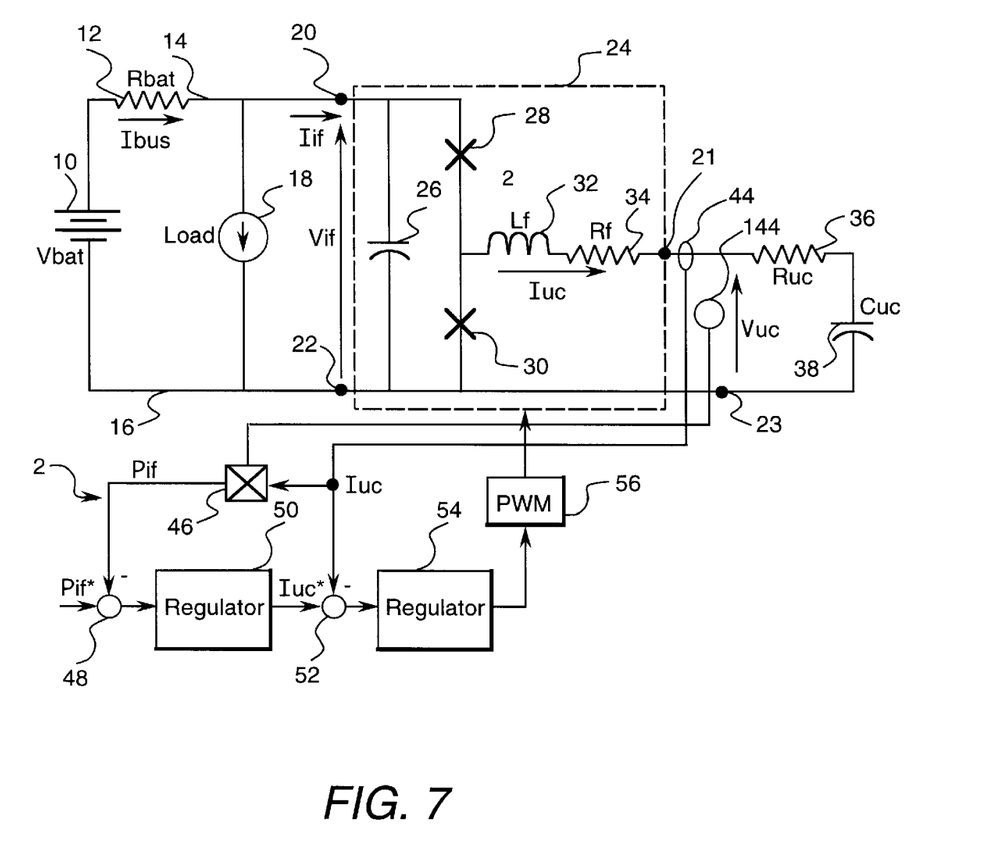
FIG. 7 is a circuit diagram of another power control system for the converter of FIG. 1.

FIG. 7 is a circuit diagram of another power control system 2 for the converter of FIG. 1. In the embodiment of FIG. 7, the power on the auxiliary energy storage device side of the converter is regulated instead of the power on the power bus side of the converter. Current sensor 44 and a voltage sensor 144 provide current Iuc and voltage Vuc measurements which can be multiplied with multiplier 46 to determine the power for comparison with the commanded power signal at comparator 48. The current comparator 52, regulator 54, and PWM 56 operate in the same manner as discussed with respect to FIG. 2. The voltage limiting systems of FIGS. 3 and 4 can also be used with the embodiment of FIG. 7.

Figure 8:
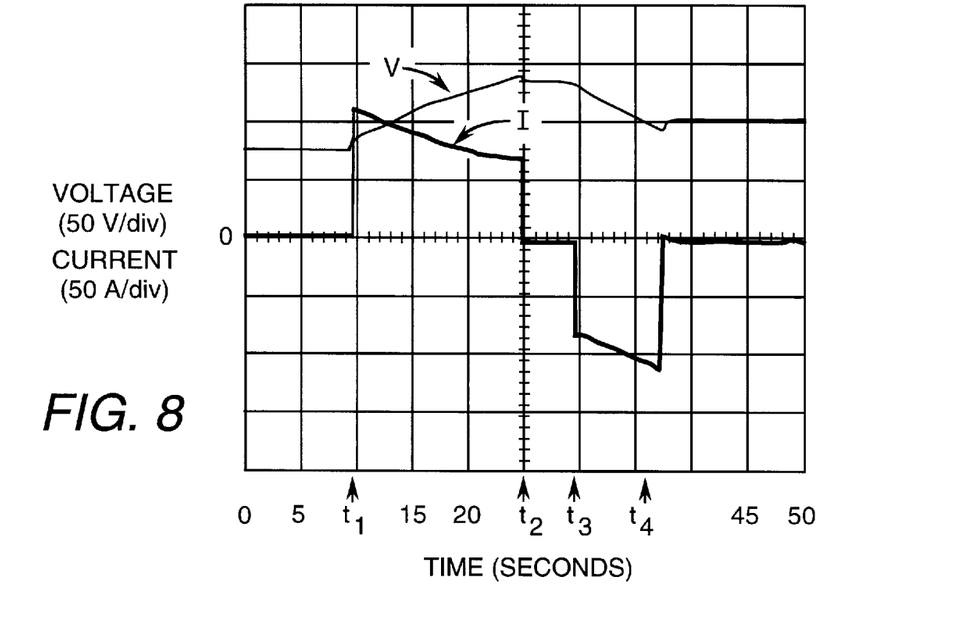
FIGS. 8 and 9 are graphs of measured voltage and current waveforms for the power control system of the embodiment of FIG. 7.
Figure 9:
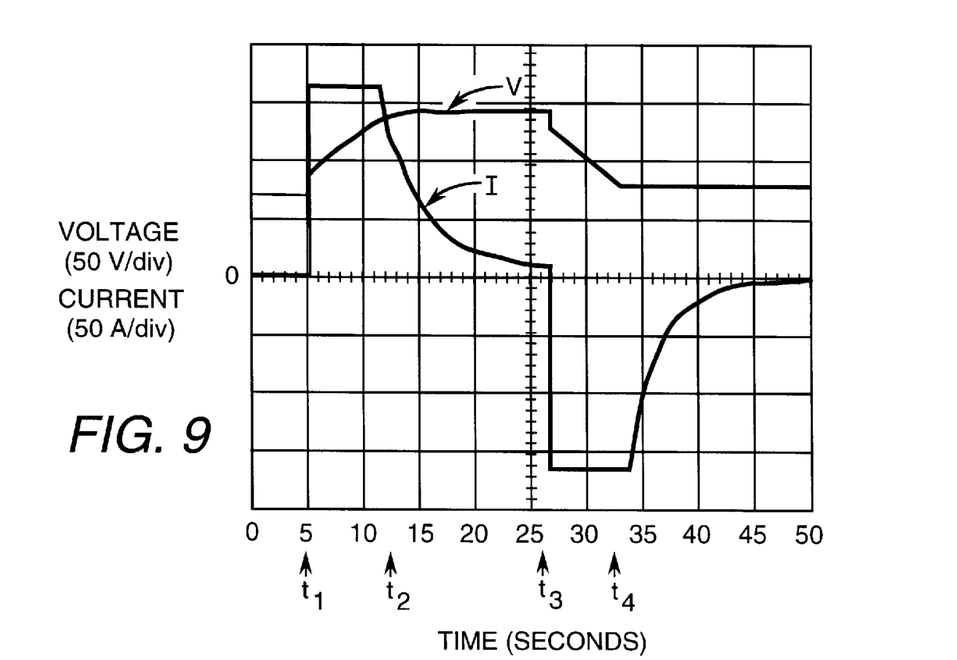

FIG. 8 is a graph of measured voltage and current waveforms for the power control system of the embodiment of FIG. 7. FIG. 9 is a graph illustrating waveforms resulting from a combination of the power control system of FIG. 7 and the voltage limiting system of FIG. 3. In the experiments, a 300 volt DC voltage source was used for battery 10, an ultra-capacitor was used for auxiliary energy storage device 38, and the ultra-capacitor voltage limit range was 75–150 volts.

In FIG. 8, initially, the ultra-capacitor voltage Vuc was at one-half of rated voltage, and the current Iuc was at zero. Between points t1 and t2 a +10 kW commanded power signal Pif* was applied to charge the ultra-capacitor to near rated voltage from battery 10. After the ultra-capacitor was charged, between points t2 and t3, a 0 kW commanded power signal was applied. Between points t3 and t4 a −10 kW commanded power signal was applied to discharge the ultra-capacitor. After point t4, a 0 kW commanded power signal was applied. The charge and discharge periods of this example permitted the ultra-capacitor power to follow the commanded power signal and operate in a linear range.

In FIG. 9, at point t1, a +25 kW commanded power signal charge was applied to charge the ultra-capacitor. At point t2, the voltage threshold was approached and the voltage limiting system began limiting the power. At point t3, a −25 kW commanded power signal charge was applied to discharge the ultra-capacitor, and at point t4, the lower voltage threshold was approached and the voltage limiting system again began limiting the power. The control system thus smoothly transitioned to a non-linear mode of operation during current and voltage limiting functions.

FIG. 10 is a circuit diagram of a power control system for use with an AC power bus. Except for the AC power bus 210, this embodiment is similar to the DC power bus embodiment of FIGS. 2 and 3. The inductance of converter 224 is represented by interface inductors 231, 233, and 235, and the resistance of converter 224 is represented by interface resistor 236.

Instead of a single current sensor and a single voltage sensor, at least two current sensors 243 and at least two voltage sensors 242 and 243 are needed to measure current signals (Iifa, Iifb, and Iifc) on the three phase lines and to measure line-to-line voltages Vab, Vbc, and Vac. The two or three line-to-line measured voltages can be converted to line-to-neutral measured voltage signals Va, Vb, and Vc by conventional techniques at transformer 288. If two measured current signals are used, a third "measured" current signal can be calculated by conventional techniques at transformer 251. If the system is a neutral controlled balanced or unbalanced system, then three current and three voltage sensors will be needed.

The measured current signals are multiplied at multiplier 290 by their respective line-to-neutral measured voltage signals to provide actual power signals. Preferably the actual power signals are expressed in complex terms with real and reactive components. The actual power signals are compared to the commanded power signals at power comparator 240. Optionally, the commanded power signals can be limited by command multiplier 262 in accordance with a voltage across the auxiliary energy storage device 238 sensed by voltage sensor 260.

Regulator 250 uses the power comparison signals to generate commanded current signals which are compared at current comparator 252 with the measured current signals. Regulator 254 generates duty cycle signals from the current comparison signals of comparator 252 for the PWM 256 to control switching of voltage converter 224.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A control system for regulating bi-directional power flow from a power bus through a voltage converter to an auxiliary energy storage device, the control system comprising:

a power comparator for comparing a power signal on input terminals of the converter with a commanded power signal and producing a power comparison signal;

a power regulator for transforming the power comparison signal to a commanded current signal;

a current comparator for comparing the commanded current signal with a measured current signal on output terminals of the converter and producing a current comparison signal;

a current regulator for transforming the current comparison signal to a pulse width modulator (PWM) duty cycle command signal;

a PWM for using the PWM duty cycle command signal to control electrical switches of the converter.

2. The control system of claim 1 further including a current sensor for measuring the current signal on the input terminals, a voltage sensor for measuring a voltage signal between the input terminals, and a multiplier for multiplying the current and voltage signals to obtain the power signal on the input terminals.

3. The control system of claim 1, further including a voltage limiting system of the output terminals including:
   a command multiplier for converting a voltage signal across the output terminals of the converter to a gain signal having a value between zero (0) and unity (1), and
   a power multiplier for multiplying the commanded power signal by the gain signal to provide a limited commanded power signal,
   wherein the power comparator compares the limited commanded power signal with the power signal on the input terminals.

4. The control system of claim 1, further including
   a command multiplier for converting a voltage signal across the output terminals of the converter to a gain signal having a value between zero (0) and unity (1), and
   a current multiplier for multiplying the commanded current signal by the gain signal to provide a limited commanded current signal,
   wherein the current comparator compares the limited commanded current signal with the measured current signal.

5. A voltage limiting system for a voltage converter, the control system comprising:
   a command multiplier for converting a voltage signal across output terminals of the converter to a gain signal having a value between zero (0) and unity (1);
   a current multiplier for multiplying a commanded current signal by the gain signal to provide a limited commanded current signal;
   a current comparator for comparing the limited commanded current signal with a measured current signal on an output terminal of the converter and producing a current comparison signal;
   a current regulator for transforming the current comparison signal to a pulse width modulator (PWM) duty cycle command signal; and
   a PWM for using the PWM duty cycle command signal to control electrical switches of the converter.

6. The voltage limiting system of claim 5 wherein the command multiplier is adapted to convert the voltage signal to a gain signal of unity (1) if the voltage is within upper and lower threshold values, to a gain signal of zero (0) if the voltage is outside upper and lower limit values, or to a gain signal between unity and zero if the voltage is outside the upper and lower threshold values and inside the upper and lower limit values.

7. A control system for regulating bi-directional power flow from a power bus through a voltage converter to an auxiliary energy storage device, the control system comprising:
   a power comparator for comparing a power signal on output terminals of the converter with a commanded power signal and producing a power comparison signal;
   a power regulator for transforming the power comparison signal to a commanded current signal;
   a current comparator for comparing the commanded current signal with a measured current signal on the output terminals of the converter and producing a current comparison signal;
   a current regulator for transforming the current comparison signal to a pulse width modulator (PWM) duty cycle command signal;
   a PWM for using the PWM duty cycle command signal to control electrical switches of the converter.

8. A control system for regulating bi-directional power flow from a multi-phase power bus through a voltage converter to an auxiliary energy storage device, the control system comprising:
   a power comparator for comparing power signals on input terminals of the converter with commanded power signals and producing power comparison signals;
   a power regulator for transforming the power comparison signals to commanded current signals;
   a current comparator for comparing the commanded current signals with measured current signals on the input terminals of the converter and producing current comparison signals;
   a current regulator for transforming the current comparison signals to pulse width modulator (PWM) duty cycle command signals;
   a PWM for using the PWM duty cycle command signals to control electrical switches of the converter.

9. The control system of claim 8, further including a voltage limiting system of output terminals of the converter including:
   a command multiplier for converting a voltage signal across the output terminals of the converter to a gain signal having a value between zero (0) and unity (1), and
   a power multiplier for multiplying the commanded power signals by the gain signal to provide limited commanded power signals,
   wherein the power comparator compares the limited commanded power signals with the power signals on the input terminals.

10. A method for regulating bi-directional power flow from a power bus through a voltage converter to an auxiliary energy storage device, the method comprising:
    comparing a power signal on input terminals of the converter with a commanded power signal and producing a power comparison signal;
    transforming the power comparison signal to a commanded current signal;
    comparing the commanded current signal with a measured current signal on output terminals of the converter and producing a current comparison signal;
    transforming the current comparison signal to a pulse width modulator (PWM) duty cycle command signal; and
    using the PWM duty cycle command signal to control electrical switches of the converter.

11. The method of claim 10 further including measuring the current signal on the input terminals, measuring a voltage signal between the input terminals, and multiplying the current and voltage signals to obtain the power signal on the input terminals.

12. The method of claim 10, further including limiting a voltage on the output terminals by:
    converting a voltage signal across the output terminals of the converter to a gain signal having a value between zero (0) and unity (1), and
    multiplying the commanded power signal by the gain signal to provide a limited commanded power signal,
    wherein comparing the commanded power signal with the power signal on the input terminals comprises comparing the limited commanded power signal with the power signal on the input terminals.

13. The method of claim 10, further including converting a voltage signal across the output terminals of the converter to a gain signal having a value between zero (0) and unity (1), and multiplying the commanded current signal by the gain signal to provide a limited commanded current signal, wherein comparing the commanded current signal with the measured current signal comprises comparing the limited commanded current signal with the measured current signal.

14. A method for regulating bi-directional power flow from a power bus through a voltage converter to an auxiliary energy storage device while limiting voltage on the auxiliary energy storage device, the method comprising:

converting a voltage signal across output terminals of the converter to a gain signal having a value between zero (0) and unity (1);

multiplying a commanded current signal by the gain signal to provide a limited commanded current signal;

comparing the limited commanded current signal with a measured current signal on an output terminal of the converter and producing a current comparison signal;

transforming the current comparison signal to a pulse width modulator (PWM) duty cycle command signal; and using the PWM duty cycle command signal to control electrical switches of the converter.

15. The method of claim 14 wherein converting the voltage signal across output terminals of the converter to a gain signal having a value between zero (0) and unity (1) comprises converting the voltage signal to a gain signal of unity (1) if the voltage is within upper and lower threshold values, to a gain signal of zero (0) if the voltage is outside upper and lower limit values, or to a gain signal between unity and zero if the voltage is outside the upper and lower threshold values and inside the upper and lower limit values.

16. A method for regulating bi-directional power flow from a power bus through a voltage converter to an auxiliary energy storage device, the method comprising:

comparing a power signal on output terminals of the converter with a commanded power signal and producing a power comparison signal;

transforming the power comparison signal to a commanded current signal;

comparing the commanded current signal with a measured current signal on the output terminals of the converter and producing a current comparison signal;

transforming the current comparison signal to a pulse width modulator (PWM) duty cycle command signal; and using the PWM duty cycle command signal to control electrical switches of the converter.

17. A method for regulating bi-directional power flow from a multi-phase power bus through a voltage converter to an auxiliary energy storage device, the method comprising:

comparing power signals on input terminals of the converter with commanded power signals and producing power comparison signals;

transforming the power comparison signals to commanded current signals;

comparing the commanded current signals with measured current signals on the input terminals of the converter and producing current comparison signals;

transforming the current comparison signals to pulse width modulator (PWM) duty cycle command signals;

using the PWM duty cycle command signals to control electrical switches of the converter.

18. The method of claim 17, further including limiting a voltage on output terminals of the converter by:

converting a voltage signal across the output terminals of the converter to a gain signal having a value between zero (0) and unity (1), and multiplying the commanded power signals by the gain signal to provide limited commanded power signals, wherein comparing power signals on the input terminals of the converter with commanded power signals on the input terminals includes comparing the limited commanded power signals with the power signals on the input terminals.

* * * * *

UNITED STATES PATENT AND TRADEMARK OFFICE
CERTIFICATE OF CORRECTION

| | | |
|---|---|---|
| PATENT NO. | : 5,903,449 | Page 1 of 1 |
| APPLICATION NO. | : 09/094285 | |
| DATED | : May 11, 1999 | |
| INVENTOR(S) | : Garrigan et al. | |

It is certified that error appears in the above-identified patent and that said Letters Patent is hereby corrected as shown below:

Col. 7, lines 25 through 26 (Claim 5), delete "the control system" and substitute therefore
-- the voltage limiting system --.

Signed and Sealed this

Fourteenth Day of June, 2011

David J. Kappos
*Director of the United States Patent and Trademark Office*